United States Patent
Toshine

(10) Patent No.: US 9,170,747 B2
(45) Date of Patent: Oct. 27, 2015

(54) STORAGE DEVICE, CONTROL DEVICE, AND CONTROL METHOD

(71) Applicant: FUJITSU LIMITED, Kawasaki-shi, Kanagawa (JP)

(72) Inventor: Naoyoshi Toshine, Munich (DE)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 14/030,610

(22) Filed: Sep. 18, 2013

(65) Prior Publication Data
US 2014/0025910 A1 Jan. 23, 2014

Related U.S. Application Data

(63) Continuation of application No. PCT/JP2011/056578, filed on Mar. 18, 2011.

(51) Int. Cl.
G06F 12/16 (2006.01)
G06F 3/06 (2006.01)

(52) U.S. Cl.
CPC .............. *G06F 3/0641* (2013.01); *G06F 3/061* (2013.01); *G06F 3/0608* (2013.01); *G06F 3/0682* (2013.01); *G06F 3/0686* (2013.01)

(58) Field of Classification Search
CPC ... G06F 3/0686; G06F 3/0641; G06F 3/0608; G06F 3/061; G06F 3/0682
See application file for complete search history.

(56) References Cited

U.S. PATENT DOCUMENTS 5,522,037 A 5/1996 Kitagawa et al.
2005/0010730 A1* 1/2005 Kano ............................. 711/161
2005/0086428 A1 4/2005 Taniyama
2008/0243754 A1* 10/2008 Gokhale et al. .................... 707/1
2008/0243769 A1* 10/2008 Arbour et al. ...................... 707/2
2009/0043960 A1 2/2009 Toshine
2009/0049260 A1 2/2009 Upadhyayula
2009/0228655 A1 9/2009 Yamane
2011/0055471 A1 3/2011 Thatcher et al.
2012/0174000 A1* 7/2012 Zavatone ...................... 715/763
2012/0260266 A1* 10/2012 Tomii ............................ 719/327
2014/0195039 A1* 7/2014 Ichimura et al. ............. 700/214

FOREIGN PATENT DOCUMENTS

EP 1 975 798 A1 10/2008
JP 7-84728 3/1995
JP 2005-122433 5/2005

(Continued)

OTHER PUBLICATIONS

Japanese Office Action issued Dec. 16, 2014 in corresponding Japanese Patent Application No. 2013-505629.

(Continued)

*Primary Examiner* — Hiep Nguyen
(74) *Attorney, Agent, or Firm* — Staas & Halsey LLP

(57) ABSTRACT

A storage device includes a data division unit that divides data into data blocks, a duplicate storage determining unit that determines whether the same data block as that to be stored has been stored in a storage unit for discharge in an export process, and a data storage processing unit that stores the data block to be stored in the storage unit for discharge when the same data block has not been stored in the storage unit for discharge and prevents the data block to be stored from being stored in the storage unit for discharge when the same data block has been stored in the storage unit for discharge. According to the storage device, it is possible to reduce the amount of data stored in the storage unit for discharge.

17 Claims, 11 Drawing Sheets

(56) References Cited

FOREIGN PATENT DOCUMENTS

| JP | 2008-257716 | 10/2008 |
|---|---|---|
| JP | 2009-43162 | 2/2009 |
| JP | 2009-211569 | 9/2009 |

OTHER PUBLICATIONS

"Introduction of Storage Technique Starting from Zero—from basics of RAID to latest hierarchical management"; ASCII Technologies, May 2010, pp. 1-80.

International Search Report mailed Apr. 26, 2011 of corresponding International Application No. PCT/JP2011/056578.

Extended European Search Report dated Jul. 16, 2014 in corresponding European Patent Application No. 11861514.5.

"Data deduplication", Wikipedia, printed from en.wikipedia.org/w/index.php?title=Data_deduplication&oldid=419227213 Mar. 17, 2011, 7 pp.

* cited by examiner

250a: BLOCK TABLE

250b: ADDRESS TABLE

STORAGE DEVICE, CONTROL DEVICE, AND CONTROL METHOD

CROSS-REFERENCE TO RELATED APPLICATION

This application is a continuation application of International Application PCT/JP2011/056578, filed on Mar. 18, 2011, and designated the U.S., the entire contents of which are incorporated herein by reference.

FIELD

The embodiments discussed herein are related to a storage device, a control device, and a control method.

BACKGROUND

A virtual tape library (VTL) virtually executes a tape drive on a disk device and makes the tape drive seem to be connected to a host device, such as a host computer (for example, see the following Patent LITERATURE 1). In the virtual tape library technique, data is written in a block unit to the disk device.

The virtual tape library can be easily introduced, without a great change in the operation of the physical tape library according to the related art, and can increase, for example, the speed of a backup process.

In addition, a system (virtual tape library system) provided with the virtual tape library includes, for example, a disk array device and uses the disk array device as a cache disk. The system has a structure which virtualizes a tape volume and emulates the tape volume on the cache disk. In general, in the virtual library system, a logical volume is stored in a high-capacity physical medium (virtual library medium), such as a tape, and is operated.

In the virtual tape library system, an export function and an import function have been known as a structure which discharges a stored logical volume and stores the logical volume in an external storage device (for example, see the following Patent LITERATURE 2).

The export function copies a plurality of logical volumes stored in the virtual library system to a physical medium (external storage medium) for external storage. The copied physical medium can be removed to the outside and then used. The import function restores the logical volume from the external storage medium removed to the outside of the virtual library system by the export function to another virtual library system.

In the export function, when the logical volume is copied to the external storage medium, a designated logical volume is copied (recalled) from the virtual library medium to the cache disk. Then, a target logical volume is stored (exported) from the cache disk to the external storage medium.

On the other hand, in the import function, when the logical volume is restored from the external storage medium, a designated logical volume is stored from the external storage medium to the cache disk. Then, the logical volume on the cache disk is stored (migrated to) in the virtual library medium.

[Patent LITERATURE 1] Japanese Laid-open Patent Publication No. 2005-122433
[Patent LITERATURE 2] Japanese Laid-open Patent Publication No. 2009-043162

However, in the virtual tape library system according to the related art, when a large number of logical volume groups need to be exported and imported by data migration at a time, it takes a lot of time to copy and restore data.

SUMMARY

According to a first aspect of the invention, a storage device includes a first storage unit that temporarily stores data, an accommodation unit that accommodates a second storage unit which stores data, an access unit that accesses the second storage unit and a storage unit for discharge, and a control unit that controls access by the access unit. The control unit includes a data division unit that divides the data into data blocks, a duplicate storage determining unit that determines whether the same data block as that to be stored has been stored in the storage unit for discharge in an export process of storing the data into the storage unit for discharge, and a data storage processing unit that stores the data block to be stored in the storage unit for discharge when the same data block has not been stored in the storage unit for discharge and prevents the data block to be stored from being stored in the storage unit for discharge when the same data block has been stored in the storage unit for discharge.

According to a second aspect of the invention, there is provided a control device that controls access to a first storage unit which temporarily stores data and a second storage unit which stores the data. The control device includes a data division unit that divides the data into data blocks, a duplicate storage determining unit that determines whether the same data block as that to be stored has been stored in a storage unit for discharge in an export process of storing the data into the storage unit for discharge, and a data storage processing unit that stores the data block to be stored in the storage unit for discharge when the same data block has not been stored in the storage unit for discharge and prevents the data block to be stored from being stored in the storage unit for discharge when the same data block has been stored in the storage unit for discharge.

According to a third aspect of the invention, there is provided a control method performed in a control device that controls access to a first storage unit which temporarily stores data and a second storage unit which stores the data. The control method includes dividing the data into data blocks, determining whether the same data block as that to be stored has been stored in a storage unit for discharge in an export process of storing the data into the storage unit for discharge, and storing the data block to be stored in the storage unit for discharge when the same data block has not been stored in the storage unit for discharge and preventing the data block to be stored from being stored in the storage unit for discharge when the same data block has been stored in the storage unit for discharge.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a virtual tape library system according to an embodiment of the invention will be described with reference to the drawings.

Figure 1:
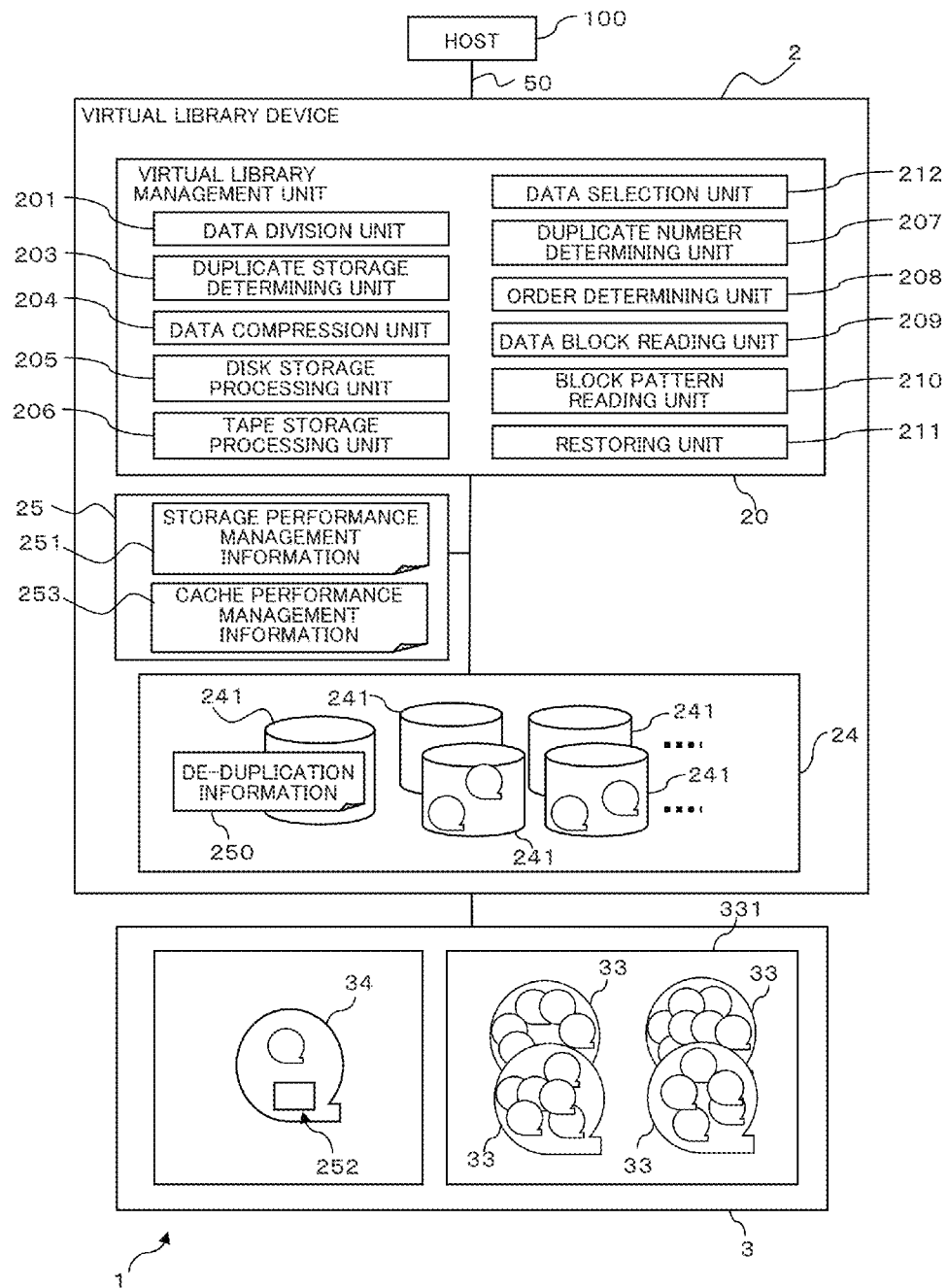
FIG. 1 is a diagram schematically illustrating the functional structure of a virtual tape library system according to an embodiment.
Figure 2:
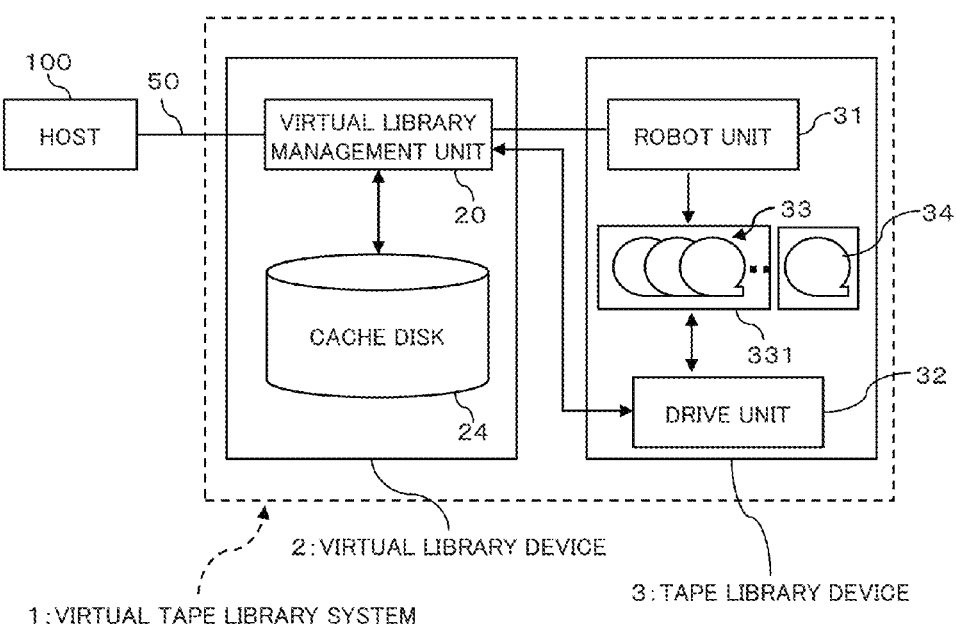
FIG. 2 is a diagram illustrating the hardware configuration of the virtual tape library system according to the embodiment.

FIG. 1 is a diagram schematically illustrating the functional structure of a virtual tape library system 1 according to an embodiment and FIG. 2 is a diagram illustrating the hardware configuration thereof.

The virtual tape library system 1 includes a cache disk (storage device) 24 and virtually performs a tape operation on the cache disk 24. The virtual tape library system 1 stores data which is transmitted from, for example, a host 100 in a logical volume (volume) which is virtually formed in the cache disk 24. For example, various kinds of data used in the host 100 are stored in the cache disk 24 by a data backup job of the host 100.

That is, the virtual tape library system 1 arranges a virtual logical volume on the cache disk 24 to perform a process at a high speed, without a mechanical operation, such as a tape mounting operation, a tape loading operation, or a tape unloading operation of the tape library device 2 according to the related art.

The tape library device 2 is connected to the back end of the virtual tape library system 1 and the logical volume is written to a high-capacity cartridge tape, which is a storage medium 33 of the tape library device 2 at the back end.

As illustrated in FIG. 2, the virtual tape library system 1 includes a virtual library device 2 and a tape library device 3. The virtual tape library system 1 is connected to the host 100, which is a host device, through a communication line 50 so as to communicate with the host 100, and stores data transmitted from the host 100 in the cache disk 24 of the virtual library device 2, which will be described below.

The host 100 has, for example, the function of a backup server and performs a scheduled backup job. The host 100 transmits data (backup data) to be stored to the virtual library device 2 and the virtual library device 2 stores the transmitted data into the cache disk 24. In this way, the backup job is performed.

As illustrated in FIG. 2, the tape library device 3 includes a robot unit 31, a cell 331, a storage medium 33, an external storage medium 34, and a drive unit 32. The tape library device 3 records data transmitted from the virtual library device 2 on the storage medium 33, or it reads out data recorded on the storage medium 33 and transmits the read-out data to the virtual library device 2.

The cell 331 is a storage rack which stores the storage medium 33 and stores a plurality of storage media 33. The storage medium 33 is a recording medium which sequentially accesses and stores data and is, for example, a magnetic tape, a cartridge tape, or a cassette tape. In the example illustrated in FIG. 2, the tape library device 3 is provided with a plurality of storage media 33.

The robot unit 31 includes a mechanism which holds and transports the storage medium 33 using an arm (not illustrated), takes out an arbitrary storage medium 33 from the cell 331, transports the storage medium 33, and inserts the storage medium 33 into the drive unit 32. The robot unit 31 selects one storage medium 33 from a plurality of storage media 33 under the control of a virtual library management unit 20 of the virtual library device 2, which will be described below. Then, the robot unit 31 transports the selected storage medium 33 and attaches the storage medium 33 to the drive unit 32.

The drive unit 32 reads and writes data from and to the storage medium 33 or the external storage medium 34. In addition, the drive unit 32 writes data in a tape format to the storage medium 33 attached by the robot unit 31 or the external storage medium 34.

In this embodiment, a plurality of drive units 32 with the same or substantially the same structure are provided. For example, any one of the plurality of drive units 32 is used to read and write data from and to the external storage medium 34 and the other drive units 32 are used to read and write data from and to the storage medium 33.

Note that, a dedicated drive unit 32 which accesses the storage medium 33 may be provided and a dedicated drive unit 32 which accesses the external storage medium 34 may be provided. Alternatively, the drive unit 32 shared by the storage medium 33 and the external storage medium 34 may be provided and may access both the storage medium 33 and the external storage medium 34. In addition, various modifications can be made.

The virtual tape library system 1 also has a migration function of moving the data stored in the cache disk 24 of the virtual library device 2 to the storage medium 33 of the tape library device 3. Data in the volume stored in the cache disk 24 is moved (saved) to the storage medium 33 of the tape library device 3 by the migration process. Note that, the migration function of the virtual tape library system 1 will be described in detail below.

The external storage medium 34 is a recording medium which sequentially accesses and stores data, similarly to the storage medium 33, and is, for example, a magnetic tape, a cartridge tape, or a cassette tape. In the example illustrated in FIG. 1, one external storage medium 34 is provided in the tape library device 3. In addition, the external storage medium 34 is attached to a drive unit (not illustrated) and the drive unit reads and writes data from and to the external storage medium 34. Note that, the drive unit 32 which reads and writes data from and to the storage medium 33 may be used as the drive unit which reads and writes data from and to the external storage medium 34.

In addition, the virtual tape library system 1 has an export function of moving the data stored in the cache disk 24 of the virtual library device 2 to the external storage medium 34 of the tape library device 3. The volume stored in the cache disk 24 is moved to the external storage medium 34 of the tape library device 3 by the export process. Note that, the export process of the virtual tape library system 1 will be described in detail below.

The virtual library device 2 includes the virtual library management unit 20 and the cache disk 24. The virtual library device 2 is provided between the host 100 and the tape library device 3 and stores data transmitted from the host 100 in a virtual tape volume (logical volume) of the cache disk 24.

The cache disk 24 is a disk array device such as an RAID (Redundant Arrays of Inexpensive Disks) device. The cache disk 24 provides a virtual storage to the virtual library management unit 20. The disk array device includes a plurality of disk volumes 241. The disk volume 241 is a disk device for storing a logical volume and a virtual tape volume (logical volume) is stored in each disk volume 241. The logical volume indicates logical access unit data when the host 100 accesses data in the tape library device 3.

The cache disk (data block pattern storage unit) 24 stores de-duplication information (data block pattern) 250.

The de-duplication information 250 is information about the data block forming data and indicates, for example, the data block formed by dividing data, a hash key thereof, and the structure of the data block. In this embodiment, the de-duplication information 250 includes a block table 250a, an address table 250b, and a data block configuration.

Figure 3:
FIG. 3 is a diagram illustrating a block table in the virtual tape library system according to the embodiment.
Figure 4:
FIG. 4 is a diagram illustrating an address table in the virtual tape library system according to the embodiment.

FIG. 3 is a diagram illustrating an example of the block table 250a in the virtual tape library system 1 according to the embodiment and FIG. 4 is a diagram illustrating an example of the address table 250b.

The block table 250a is information for managing each data block forming data and the hash key thereof and includes a block number and FP which are associated with each other, as illustrated in FIG. 3. The block number is identification information for uniquely identifying the FP generated from the data block. The FP is a finger print which is created by, for example, a method of calculating the hash value of the data block. The duplicate storage determining unit 203 determines whether the data blocks are identical to each other using the FP and determines the duplication of the data blocks on the basis of the determination result. In this embodiment, it is determined that the data blocks with the same FP are identical to each other.

The address table 250b is information (address information) in which the FP of the data block is associated with the address of the storage area of the cache disk 24 storing the data block represented by the FP.

The data block configuration is, for example, the index of the data block forming data and indicates, for example, the position of each data block in the volume. It is possible to restore the data using the data block, with reference to the data block configuration.

That is, the cache disk 24 (disk volume 241) functions as a data block pattern storage unit which stores a data block pattern for data.

Note that, the block table 250a, the address table 250b, and the data block configuration are set by, for example, the duplicate storage determining unit 203.

The virtual library management unit 20 is, for example, a computer (server computer) with a server function and manages the control of the virtual tape library or controls the analysis and management of a de-duplication pattern.

The virtual library management unit 20 stores the transmitted data into the cache disk 24 in response to an instruction from the host 100. The virtual library management unit 20 transmits the data stored in the cache disk 24 to the host 100 in response to an instruction from the host 100. The virtual library management unit 20 performs a migration or export process of moving the data stored in the cache disk 24 to the storage medium 33 or the external storage medium 34 of the tape library device 3 in response to an instruction from the host 100.

For example, the virtual library management unit 20 includes a memory 25 in addition to a CPU (Central Processing Unit), a RAM (Random Access Memory), a ROM (Read Only Memory), and an HDD (Hard Disk Drive) which are not illustrated in the drawings. The CPU executes an OS (Operating System) or various programs stored in, for example, the HDD to implement various functions. The memory (recording device) 25 is, for example, a non-volatile memory. Storage performance management information 251 and cache performance management information 253 are stored in the memory 25.

The storage performance management information 251 is information for managing the storage state (storage performance) of the block data in the external storage medium 34, which will be described below. Specifically, during the export process, when the tape storage processing unit 206, which will be described below, stores the block data into the external storage medium 34, information for specifying the block data stored in the external storage medium 34 is stored in the storage performance management information 251 so as to be associated with information for identifying the volume.

The cache performance management information 253 is information for managing the data stored in the cache disk 24. For example, information for identifying the logical volume stored in the cache disk 24 is stored in the cache performance management information 253. A process of registering information to the cache performance management information 253 is performed, for example, whenever the disk storage processing unit 205, which will be described below, stores data into the cache disk 24.

Note that, the memory 25 which stores the storage performance management information 251 or the cache performance management information 253 is not limited. For example, the memory 25 may be other recording devices, such as the RAM or the HDD which temporarily stores and develops data in order to execute an OS or a program.

In addition, the memory 25 stores management information indicating the correspondence between the logical volume and the disk volume 241.

The CPU executes an OS or a control program stored in, for example, the HDD to implement the functions of the virtual library management unit 20. As illustrated in FIG. 1, the virtual library management unit 20 functions as a data division unit 201, a duplicate storage determining unit 203, a data compressing unit 204, a disk storage processing unit 205, a tape storage processing unit 206, a duplicate number determining unit 207, an order determining unit 208, a data block reading unit 209, a block pattern reading unit 210, a data selection unit 212, and a restoring unit 211.

The data division unit 201 has a data de-duplication function of dividing data into predetermined data blocks and divides, for example, backup data received from the host 100. The data division unit 201 divides data in a fixed length type or a variable length type. In this embodiment, the fixed length type is a method of dividing data into data blocks with a predetermined size and the variable length type is a method of dividing data according to a specific division rule. Note that, the division of data by the data division unit 201 can be implemented by various known methods and thus the detailed description thereof will not be repeated.

The duplicate storage determining unit 203 determines the duplication state of the data blocks. For example, the duplicate storage determining unit 203 determines whether the same data blocks as those forming data in an export process of storing the data into the external storage medium 34 have been stored in the external storage medium 34.

The duplicate storage determining unit 203 performs the determination process for each data block. For example, the duplicate storage determining unit 203 calculates the hash value for the data block to be processed, generates FP, and determines whether a data block with the same FP as the data block to be processed has been stored in the external storage medium 34 on the basis of the FP, with reference to the storage performance management information 251. In this way, it is determined whether the same data block has been stored in the external storage medium 34.

When it is determined that the same data block as that to be processed has been stored in the external storage medium 34, the duplicate storage determining unit 203 discards the data block to be processed and prevents the duplicate storage of the data block to be processed in the external storage medium 34. That is, the duplicate storage determining unit 203 performs de-duplication in which only one data block with the same FP is stored in the external storage medium 34. That is, the duplicate storage determining unit 203 functions as a de-duplication engine.

Note that, in the de-duplication, for example, an in-line method can be used which stores data into a storage device while comparing the data using a control unit of the storage device. Note that, the method is not limited thereto, but various modifications can be made without departing from the scope and spirit of this embodiment. For example, a post-process method may be used which stores data into a storage device once and compares the data using a control unit of the storage device to perform de-duplication. In addition, a client method may be used which compares data using a device outside a storage device, such as a backup management server or a client, to perform de-duplication and stores the data into the storage device. Furthermore, the de-duplication method may be appropriately changed.

The block number is identification information which is given to each data block in order to specify each data block divided from the data which is de-duplicated by the storage device 100.

The FP is a code, such as a hash value obtained by converting each data block with a hash function, is changed depending on the content of the block, and is used to determine whether the data blocks include the same content. Note that, the generation of the FP from the data block can be performed by various known methods and thus the detailed description thereof will not be repeated. In addition, it is assumed that the FP includes a sufficient digit number in order to prevent the blocks with different content from including the same FP.

For example, in the de-duplication according to this embodiment, the FPs are compared in the block table 250a. Among data blocks having the same FP, one data block is stored in the external storage medium 34, and the remaining data blocks are not stored in a storage device 120. Therefore, since the duplicate data block is not stored in the external storage medium 34, the storage area of the external storage medium 34 is reduced.

The duplicate storage determining unit 203 stores, for example, the creation result of the FP or the data block configuration for each data block in de-duplication information 510. Note that, in some cases, the process of creating the FP or the data block configuration for the data block is referred to as duplication pattern analysis.

The data compressing unit 204 performs a compression process of compressing the data block. The data compressing unit 204 compresses the data block de-duplicated by the duplicate storage determining unit 203 and stores the compressed data block in the external storage medium 34.

In this way, it is possible to minimize the amount of data discharged to the external storage medium 34 and store a large number of logical volumes in one external storage medium 34 with high efficiency in a short time.

Note that, as a data compression method performed by the data compressing unit 204, various known methods may be appropriately used.

The tape storage processing unit (data storage processing unit) 206 stores data into the external storage medium 34 or the storage medium 33.

During the export process, when the duplicate storage determining unit 203 determines that the same data block as that to be processed has not been stored in the external storage medium 34, the tape storage processing unit 206 stores the data block to be processed in the external storage medium 34. When the duplicate storage determining unit 203 determines that the same data block as that to be processed has been stored in the external storage medium 34, the tape storage processing unit 206 prevents the storage of the data block to be processed in the external storage medium 34. That is, the tape storage processing unit 206 does not store the same data block in the external storage medium 34.

During the export process, the tape storage processing unit 206 stores de-duplication information 252 about the data stored in the external storage medium 34 in a predetermined storage area of the external storage medium 34.

Specifically, the tape storage processing unit 206 extracts the de-duplication information 252 corresponding to the data stored in the external storage medium 34 from the de-duplication information and stores the extracted de-duplication information 252 in the external storage medium 34.

Note that, it is preferable that the process of storing the de-duplication information 252 about the exported logical volume in the external storage medium 34 be performed in, for example, the final stage of the process of exporting the logical volume to the external storage medium 34.

In the external storage medium 34, for example, the de-duplication information 252 may be stored in a non-volatile memory, such as a cartridge memory (CM) provided in the external storage medium 34, or it may be stored in a medium area (recording tape) which stores data into the external storage medium 34. Note that, when the de-duplication information 252 is stored in the medium area of the external storage medium 34, for example, it is preferable that the de-duplication information 252 be stored at a data read position ahead of a data storage position in the medium area.

The disk storage processing unit 205 stores data into the cache disk 24. The disk storage processing unit 205 stores the data received from the host 100 in the cache disk 24. In addition, when the compressing unit 204 compresses data, the disk storage processing unit 205 stores the compressed data into the cache disk 24.

In a recall process of storing the data stored in the storage medium 33 in the cache disk 24, the disk storage processing unit 205 stores the data into the cache disk 24.

For example, whenever a logical volume is stored in the cache disk 24, the disk storage processing unit 205 registers information (for example, a volume ID or a volume name) for identifying the logical volume in the cache performance management information 253.

The duplicate number determining unit 207 calculates the number (duplicate number) of duplicate data blocks between each volume stored in the storage medium 33 and the external storage medium 34. Note that, the duplicate number determining unit 207 can know the data block stored in the external storage medium 34, for example, with reference to the storage performance management information 251.

That is, the duplicate number determining unit 207 determines the number of duplicate data blocks between the data stored in the storage medium 33 and the data stored in the external storage medium 34.

During the export process, the data selection unit 212 selects the logical volume (data) to be stored in the external storage medium 34. In some cases, the logical volume which is an export target and has not been exported is referred to as an export target logical volume. For example, the operator selects the export target logical volume from the logical volumes included in the virtual tape library system 1.

The data selection unit 212 determines the logical volume to be exported among a plurality of export target logical volumes. Note that, in some cases, the logical volume to be exported is referred to as an export execution logical volume.

In each export process, when the data selection unit 212 selects the next logical volume to be exported, it is possible to respond to a change in situation during the operation of the system and thus flexibly operate the system.

In this embodiment, the data selection unit 212 selects the logical volume, which is an export execution target, in the order of the following algorithms.

(1) A logical volume with the largest number of data blocks which duplicate the data block group exported to the external storage medium 34.

(2) A logical volume with the largest number of duplicate data blocks in an export target logical volume group.

The number of duplicate data blocks is the total number of duplicate data blocks between a target logical volume and all of the export target logical volumes and is calculated by the duplicate number determining unit 207.

As such, the data selection unit 212 selects the volume to be preferentially stored in the external storage medium 34 on the basis of the number of duplicate data blocks calculated by the duplicate number determining unit 207.

When there are a plurality of logical volumes to be exported, the data selection unit 212 selects the logical volume with a large number of data blocks which duplicate the data blocks stored in the external storage medium 34 as the export target volume. For example, the export target volume is selected by checking the data blocks stored in the external storage medium 34 with reference to the storage performance management information 251 stored in the RAM 25.

In this way, when the export process is performed, a large number of data blocks duplicate the data blocks stored in the external storage medium 34 and it is possible to effectively use the external storage medium 34 using de-duplication or perform the export process at a high speed.

The data selection unit 212 selects a volume with a large number of data block (constituent data blocks) among the volumes stored in the storage medium 33 as the volume (export execution logical volume) to be preferentially stored in the external storage medium 34.

In this way, during the export process, when many types of data blocks are stored in the external storage medium 34 and then data blocks are stored in the external storage medium 34, the rate of occurrence of duplicate data blocks is expected to be improved and it is possible to effectively use the external storage medium 34.

When a plurality of logical volumes to be initially processed are extracted by the selection process using the algorithm, the data selection unit 212 preferentially selects the logical volume in which data is stored on the cache disk 24. Note that, for example, the logical volume stored on the cache disk 24 is checked with reference to the cache performance management information 253 stored in the RAM 25.

The order determining unit 208 determines the order in which the storage medium 33 is transported to the drive unit 32 when a plurality of logical volumes are exported. The order determining unit 208 selects the storage medium 33 storing the volume which is selected to be stored in the external storage medium 34 by the data selection unit 212 as the storage medium 33 to be transported to the drive unit 32. That is, the order determining unit 208 determines the order in which the storage medium 33 is transported to the drive unit 32 on the basis of the number of duplicate data blocks determined by the duplicate number determining unit 207.

The data block reading unit 209 reads out the data block stored in the external storage medium 34 during an import process of storing the volume stored in the external storage medium 34 in the cache disk 24.

During the import process, the block pattern reading unit 210 reads out the de-duplication information 252 about the volume stored in the external storage medium 34 from the external storage medium 34.

The restoring unit 211 restores the volume from the data block during the import process. The restoring unit 211 restores the volume using the data block read by the data block reading unit 209, with reference to the de-duplication information 252 which is read from the external storage medium 34 by the block pattern reading unit 210. That is, the data blocks are rearranged or copied on the basis of the de-duplication information 252 to create a volume.

A CPU of an information processing device executes a control program to function as the data division unit 201, the duplicate storage determining unit 203, the data compressing unit 204, the disk storage processing unit 205, the tape storage processing unit 206, the duplicate number determining unit 207, the order determining unit 208, the data block reading unit 209, the block pattern reading unit 210, the data selection unit 212, and the restoring unit 211.

Note that, the program (control program) for implementing the functions of the data division unit 201, the duplicate storage determining unit 203, the data compressing unit 204, the disk storage processing unit 205, the tape storage processing unit 206, the duplicate number determining unit 207, the order determining unit 208, the data block reading unit 209, the block pattern reading unit 210, the data selection unit 212, and the restoring unit 211 is recorded on a computer-readable recording medium, such as a flexible disk, a CD (for example, CD-ROM, CD-R, or CD-RW), a DVD (for example, DVD-ROM, DVD-RAM, DVD-R, DVD+R, DVD-RW, or DVD+RW), a magnetic disk, an optical disk, or a magneto-optical disk, and is then provided. The computer reads the program from the recording medium and transmits the program to an internal storage device or an external storage device, and the program is stored in the storage device and is then used. The program may be recorded on a storage device (recording medium), such as a magnetic disk, an optical disk, or a magneto-optical disk, and then provided from the storage device to the computer through a communication path.

When the functions of the data division unit 201, the duplicate storage determining unit 203, the data compressing unit 204, the disk storage processing unit 205, the tape storage processing unit 206, the duplicate number determining unit 207, the order determining unit 208, the data block reading unit 209, the block pattern reading unit 210, the data selection unit 212, and the restoring unit 211 are implemented, the program stored in the internal storage device (in this embodiment, the memory 25 or the ROM) is executed by a microprocessor (in this embodiment, the CPU of the virtual library management unit 20) of the computer. In this case, the computer may read the program recorded on the recording medium and execute the program.

Note that, in this embodiment, the computer is hardware which includes hardware components and an operating system and operates under the control of the operating system. When the operating system is not needed and hardware is operated only by an application program, the hardware corresponds to the computer. The hardware includes at least a microprocessor, such as a CPU, and a method for reading a computer program recorded on a recording medium. In this embodiment, the virtual library management unit 20 functions as the computer.

Figure 5:
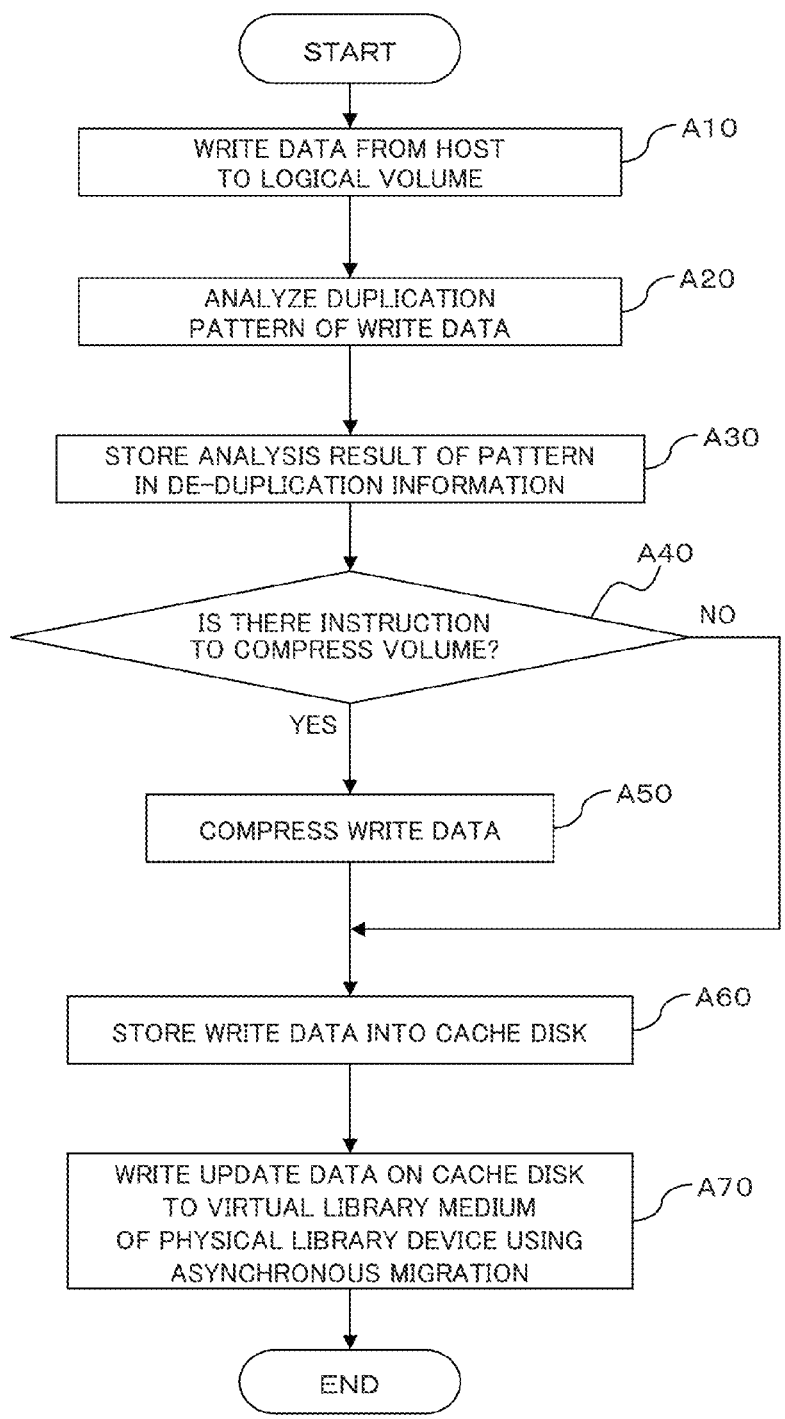
FIG. 5 is a flowchart illustrating a process when data received from a host is written in the virtual tape library system according to the embodiment.

A process when data is read from the host 100 in the virtual tape library system 1 including the above-mentioned structure according to the embodiment will be described according to the flowchart (Steps A10 to A70) illustrated in FIG. 5 while referring to FIG. 6. Note that, FIG. 6 is a diagram schematically illustrating the flow of the process when data is received in the virtual tape library system 1 according to the embodiment.

Figure 6:
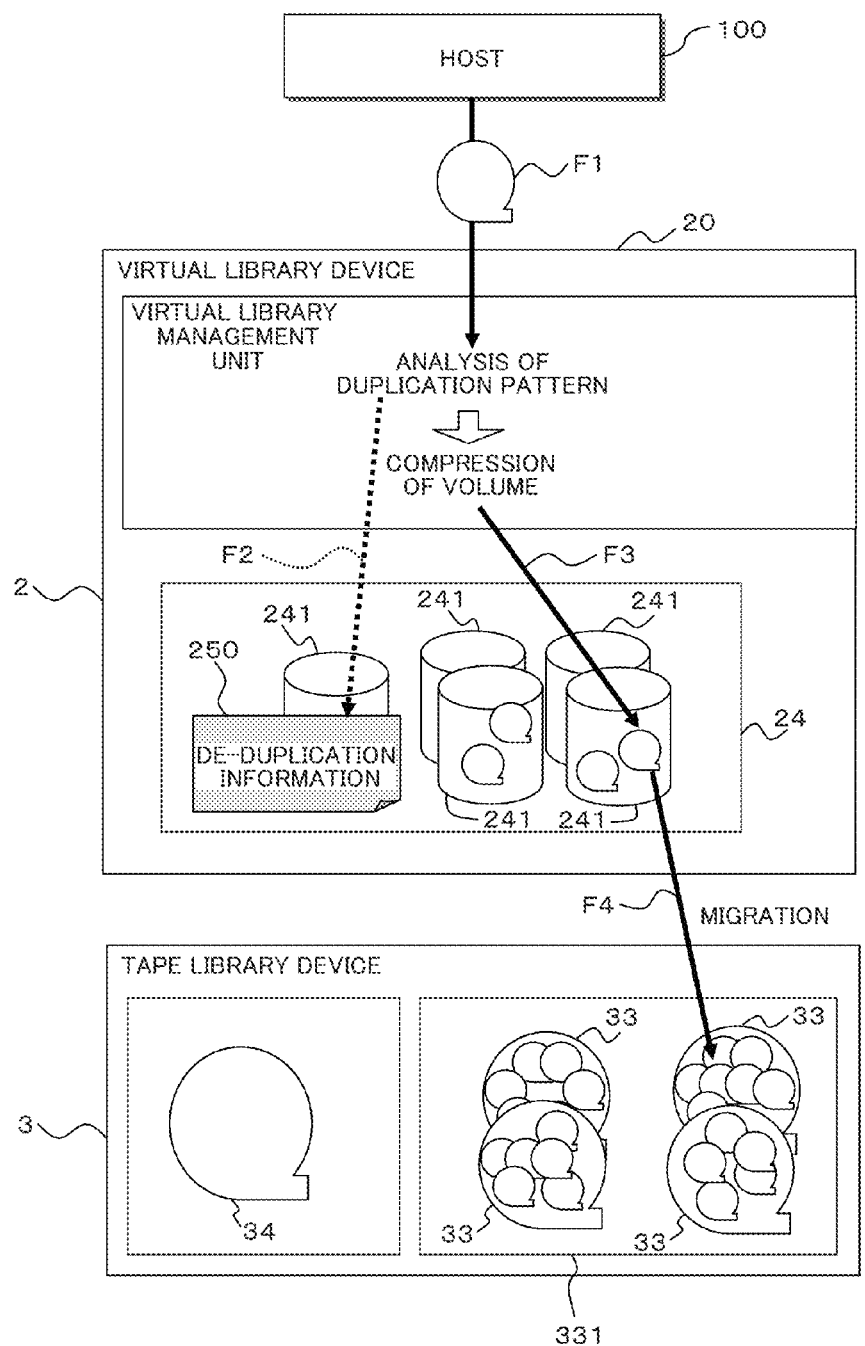
FIG. 6 is a diagram schematically illustrating the flow of a process when data is received in the virtual tape library system according to the embodiment.

The host 100 issues an instruction to write a logical volume (the writing of a volume) and the virtual library device 2 receives data from the host 100 (Step A10; reference numeral F1 in FIG. 6).

The data division unit 201 divides the received data into a plurality of data blocks and the duplicate storage determining unit 203 determines the duplication state of each data block (write data) (Step A20). In addition, the duplicate storage determining unit 203 stores the analysis result of the duplication pattern in the de-duplication information 250 (Step A30; reference numeral F2 in FIG. 6). That is, the duplicate storage determining unit 203 analyzes the duplication pattern of the volumes and stores the analysis result in the de-duplication information 510.

Then, it is checked whether the compression of the volume is designated in the volume write instruction from the host 100. When the compression of the volume is designated (see a YES route in Step A40), the data compressing unit 204 compresses the volume (Step A50) and stores the compressed volume in the cache disk 24 (Step A60; reference numeral F3 in FIG. 6).

On the other hand, when the compression of the volume is not designated (see a NO route in Step A40), the volume is stored in the cache disk 24, without being compressed (Step A60; reference numeral F3 in FIG. 6).

Data in the volume stored in the cache disk 24 is written to the storage medium 33 of the tape library device 3 by an asynchronous migration process (Step A70; reference numeral F4 in FIG. 6) and the process ends.

As such, in the virtual tape library system 1, when data received from the host 100 is written, the duplicate storage determining unit 203 analyzes the duplication pattern for each data block before write data from the host 100 is stored in the cache disk 24. However, at that time, only the extraction of a de-duplication pattern and the registration of the de-duplication pattern in the de-duplication information 250 are performed and the data is stored in the cache disk 24 without performing the actual de-duplication process.

Figure 7:
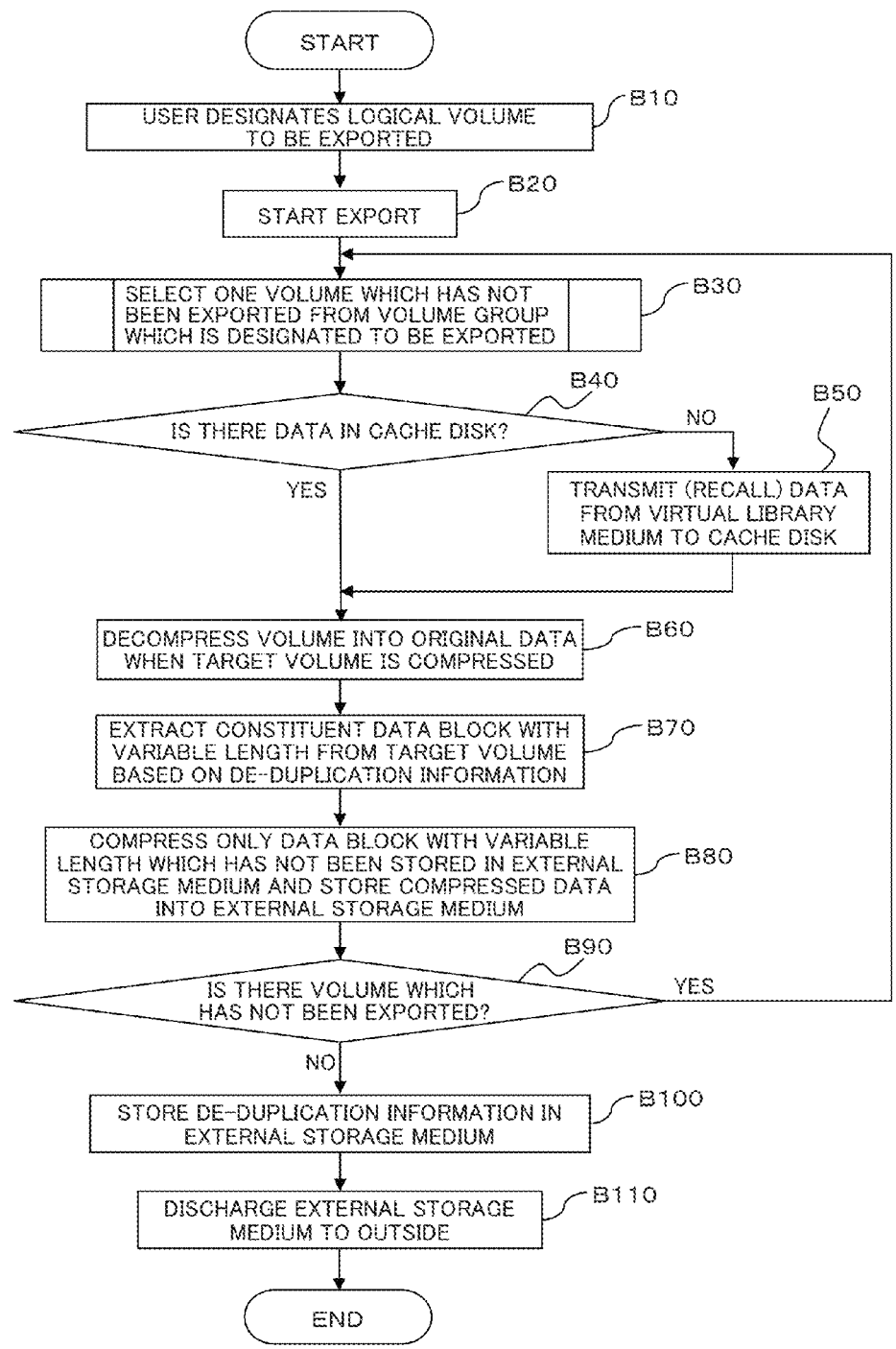
FIG. 7 is a flowchart illustrating an export process in the virtual tape library system according to the embodiment.
Figure 8:
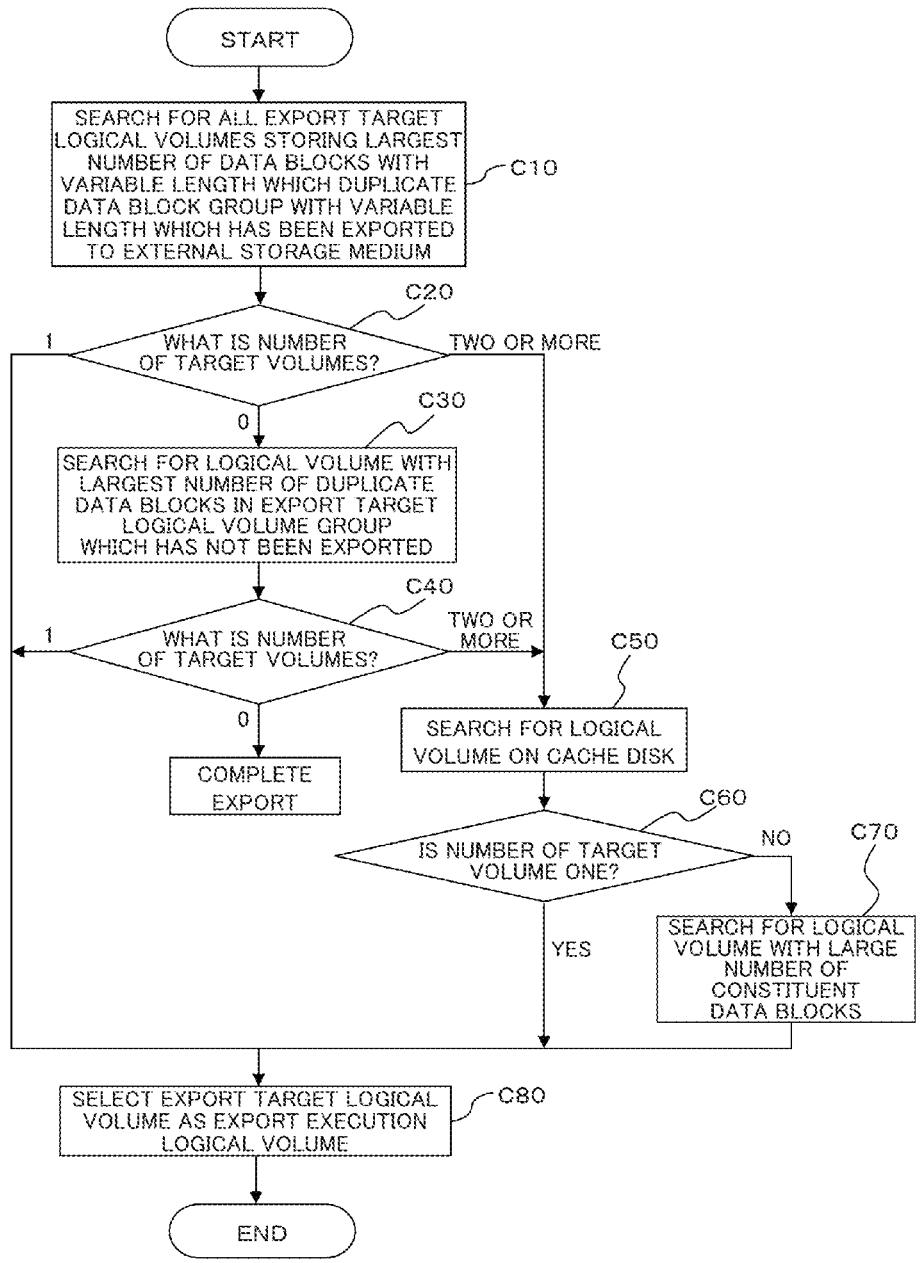
FIG. 8 is a flowchart illustrating the export process in the virtual tape library system according to the embodiment.
Figure 9:
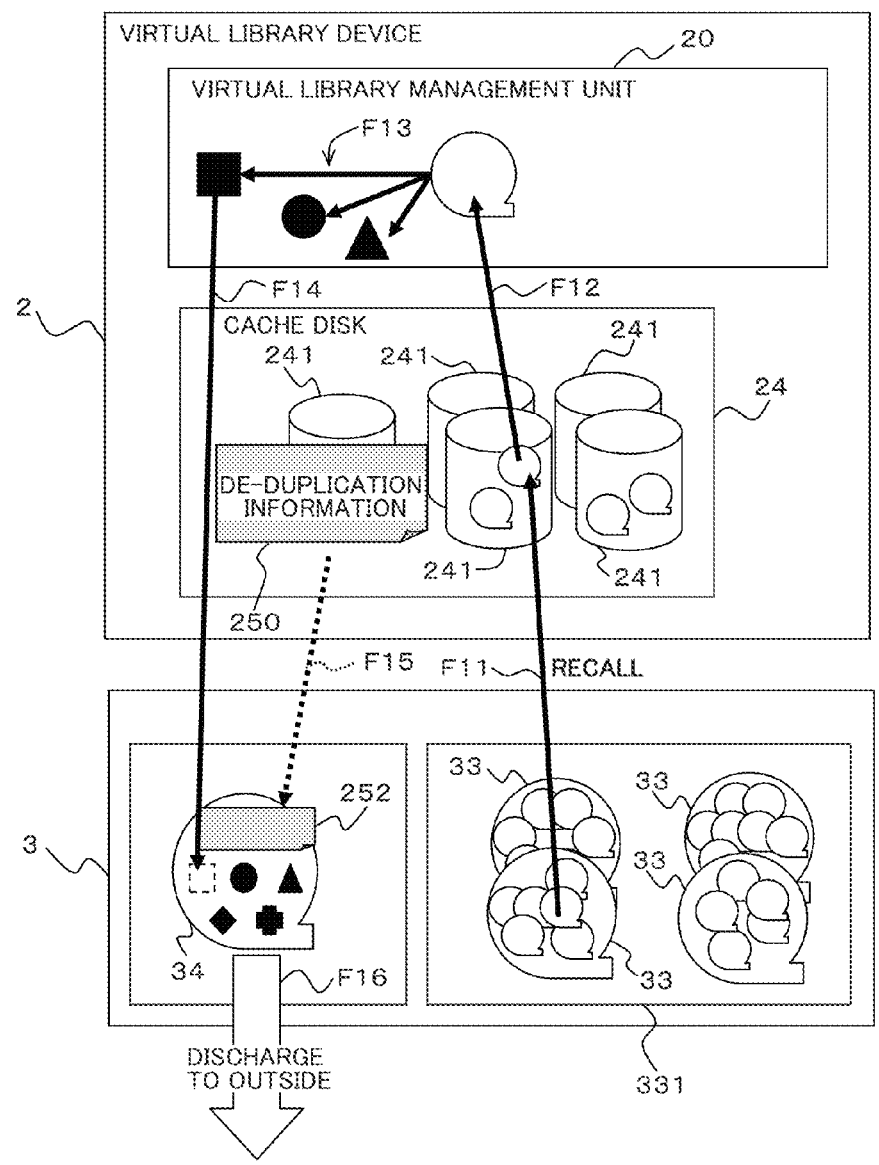
FIG. 9 is a diagram schematically illustrating the flow of the export process in the virtual tape library system according to the embodiment.

Next, the export process of the virtual tape library system 1 according to this embodiment will be described according to the flowcharts illustrated in FIGS. 7 and 8 (Steps B10 to B110 of FIG. 7 and Steps C10 to C80 of FIG. 8), with reference to FIG. 9. Note that, FIG. 9 is a diagram schematically illustrating the flow of the export process of the virtual tape library system 1 according to the embodiment. FIG. 8 is a flowchart illustrating Step B30 of FIG. 7. Note that, in this embodiment, a case will be described in which the operator designates a plurality of logical volumes as the logical volume to be exported.

In the export process, for example, first, the operator designates a plurality of logical volumes to be exported from, the computer connected to the virtual library device 2 (Step B10) and starts an export function (Step B20). For example, the operator performs an input operation using the computer connected to the virtual library device 2 to start the export function. In addition, the data selection unit 212 counts the number of designated logical volumes.

The data selection unit 212 selects one export target logical volume from a volume group including the designated plurality of logical volumes to be exported (Step B30; reference numeral F11 in FIG. 9).

In the selection of the export target logical volume, first, the data selection unit 212 searches for all export target logical volumes with the largest number of data blocks which duplicate the data block group exported to the external storage medium 34 (Step C10).

The data selection unit 212 checks the number of export target logical volumes obtained as the search result (Step C20). When only one export target logical volume is searched (see a "1" route in Step C20), the data selection unit 212 selects the searched one export target logical volume as the export execution logical volume (Step C80).

When two or more export target logical volumes are searched (a "two or more" route in Step C20), the data selection unit 212 searches for the logical volume in the cache disk 24 among the two or more export target logical volumes (Step C50).

Then, as the search result, the data selection unit 212 determines whether one export target logical volume is stored in the cache disk 24 (Step C60). When only one export target logical volume is stored (the number of target volumes=1) (see a YES route in Step C60), the data selection unit 212 selects the one export target logical volume in the cache disk 24 as the export execution logical volume (Step C80).

When two or more export target logical volumes are stored in the cache disk 24 (see a NO route in Step C60), that is, when it is difficult to reduce the number of export target logical volumes to one, the data selection unit 212 selects the logical volume with a large number of constituent data blocks as the export execution logical volume from the export target logical volume candidates (Step C70).

That is, when there are a plurality of export target logical volumes on the cache disk 24 or when all of two or more export target logical volumes are not stored in the cache disk 24, the data selection unit 212 selects the logical volume with a large number of constituent data blocks as the export execution logical volume from the export target logical volumes. At that time, when there are a plurality of export target logical volumes to be selected, for example, one export target logical volume is randomly selected as the export execution logical volume (Step C80).

When the export target logical volume with the data blocks which duplicate the data block group exported to the external storage medium 34 is not detected (see a "0" route in Step C20), the data selection unit 212 checks the number of duplicate data blocks for each export target logical volume.

The data selection unit 212 checks the number of logical volumes (export target logical volumes) (the number of target volumes) with the largest number of duplicate data blocks in the export target logical volume group (Step C30). The data selection unit 212 checks the number of target volumes (Step C40). When the number of target volumes is one (see a "1"

route in Step C40), the data selection unit 212 selects the one export target logical volume as the export execution logical volume (Step C80).

When there is no logical volume with the largest number of duplicate data blocks (see a "0" route in Step C40), it is determined that the export of all export target logical volumes is completed and there is no export target logical volume, and the export process ends. In addition, the number of logical volumes selected as the export execution logical volume may be counted and then compared with the number of designated logical volumes which are counted in Step B20 and it may be determined that the export process is completed when a process corresponding to the number of designated logical volumes is completed. In this case, even when all export target logical volumes do not duplicate each other, it is possible to reliably complete the process.

On the other hand, when a plurality of logical volumes with the largest number of duplicate data blocks are detected (a "two or more" route in Step C40), the process proceeds to Step C50.

When the export execution logical volume is selected in Step C80, the data selection unit 212 checks whether data of the selected export execution logical volume has been stored in the cache disk 24 (Step B40).

When the data of the export execution logical volume has not been stored in the cache disk 24 (a NO route in Step B40), the data of the export execution logical volume is transmitted (recalled) from the storage medium 33 of the tape library device 3 to the cache disk 24 (Step B50; reference numeral F11 in FIG. 9).

After the recall of the data of the export execution logical volume is completed or when the data of the export execution logical volume has been stored in the cache disk 24 (see a YES route in Step B40), the export execution logical volume is acquired from the cache disk 24 (reference numeral F12 in FIG. 9).

When the export execution logical volume has been compressed, the export execution logical volume is decompressed and returns to the state before compression (Step B60).

The data division unit 201 decomposes the decompressed export execution logical volume to generate (extract) a plurality of data blocks. Note that, at that time, the data division unit 201 extracts the data blocks from the export execution logical volume with reference to the de-duplication information 250 (Step B70; reference numeral F13 in FIG. 9).

The duplicate storage determining unit 203 selects only the data block which forms the export execution logical volume and has not been stored in the external storage medium 34, and the data compressing unit 204 compresses the selected data block. Then, the tape storage processing unit 206 stores the compressed data block which has not been stored in the external storage medium 34 in the external storage medium 34 (Step B80; reference numeral F14 in FIG. 9).

Then, it is checked whether there is an export target logical volume which has not been exported among the plurality of logical volumes which are designated to be exported (Step B90). When there is an export target logical volume which has not been exported (see a YES route in Step B90), the process returns to Step B30.

When the export process for all of the plurality of logical volumes which are designated to be exported is completed (see a NO route in Step B90), the tape storage processing unit 206 extracts the de-duplication information 252 about all of the export execution logical volumes stored in the external storage medium 34 from the de-duplication information 250 and stores the de-duplication information 252 in the external storage medium 34 (Step B100; reference numeral F15 in FIG. 9). Then, the external storage medium 34 is discharged from the tape library device 3 (Step B110; reference numeral F16 in FIG. 9) and the process ends.

Next, the import process of the virtual tape library system 1 according to this embodiment will be described according to the flowchart (Steps D10 to D110) illustrated in FIG. 10, with reference to FIG. 11. Note that, FIG. 11 is a diagram schematically illustrating the flow of the import process of the virtual tape library system 1 according to the embodiment.

When the import process is performed, first, the operator inserts the external storage medium 34 in which the logical block to be imported is stored into the tape library device 3 (Step D10) and starts the import function (Step D20). For example, the operator performs an input operation using the computer connected to the virtual library device 2 to start the import function.

Figure 10:
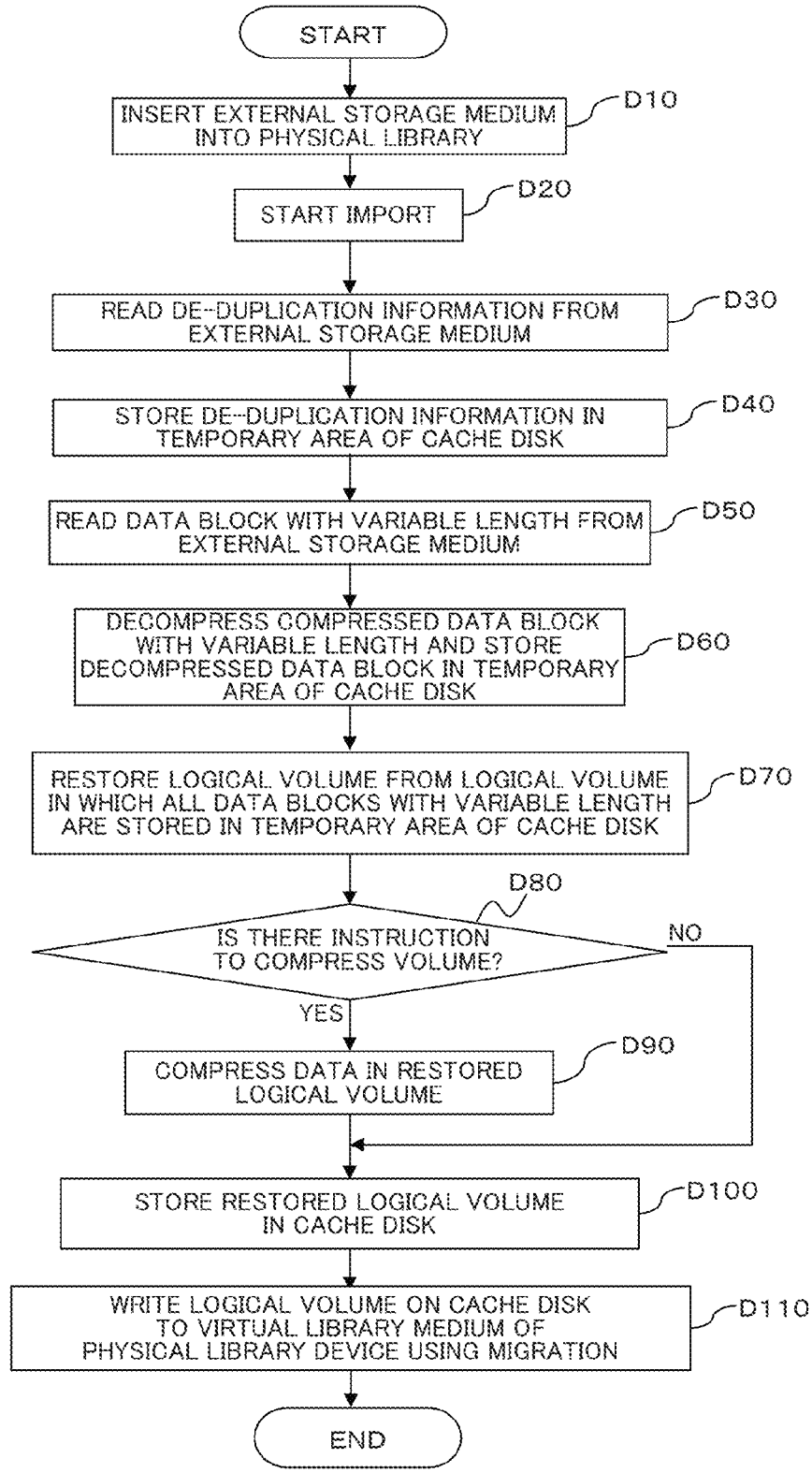
FIG. 10 is a flowchart illustrating an import process in the virtual tape library system according to the embodiment.

The block pattern reading unit 210 reads the de-duplication information 252 for the volume stored in the external storage medium 34 from the external storage medium 34 (Step D30; reference numeral F21 in FIG. 11) and stores the read de-duplication information 252 in the temporary area of the cache disk 24 (Step D40; reference numeral F22 in FIG. 10).

Figure 11:
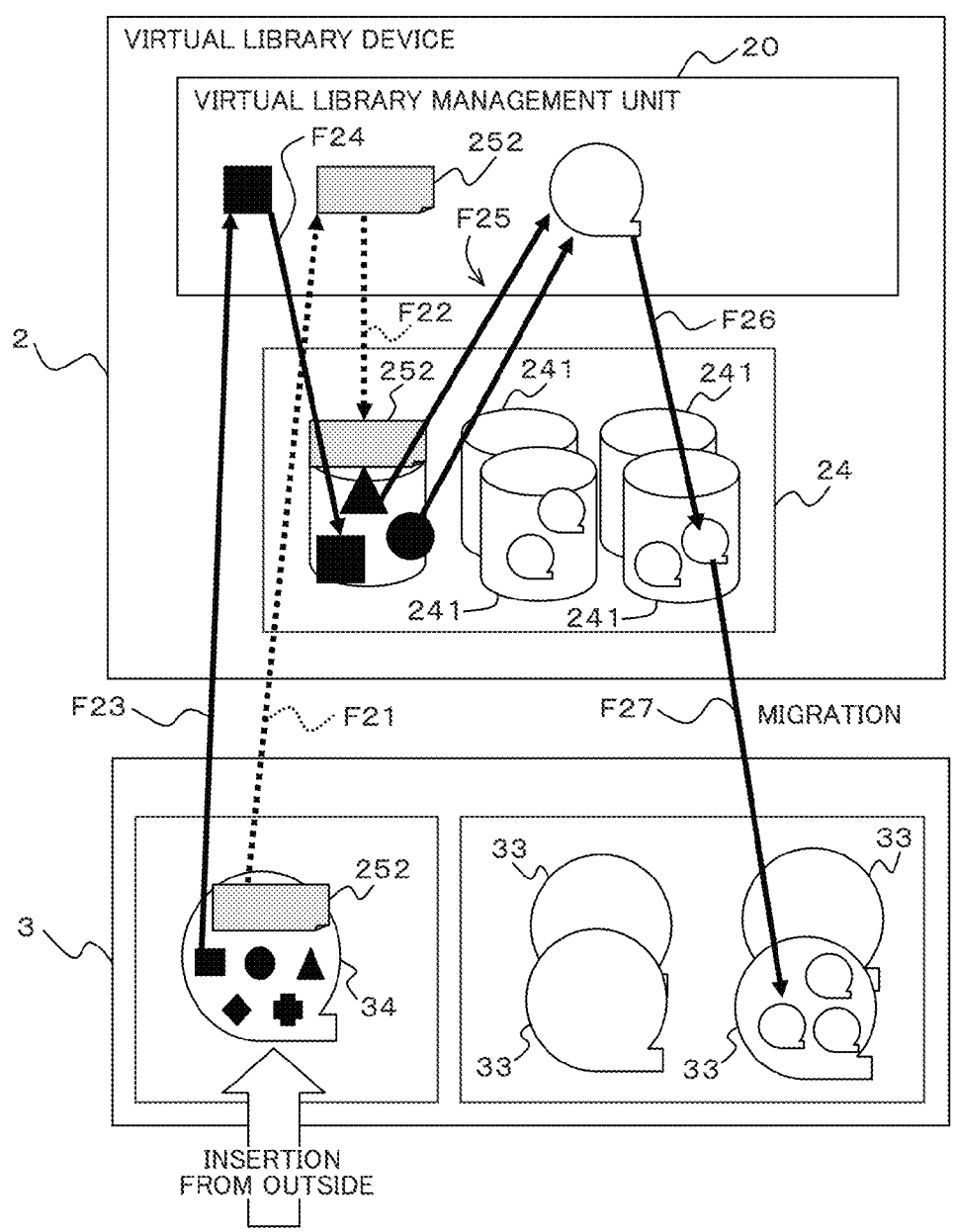
FIG. 11 is a diagram schematically illustrating the flow of the import process in the virtual tape library system according to the embodiment.

The data block reading unit 209 reads out the data block stored in the external storage medium 34 (Step D50; reference numeral F23 in FIG. 11). In addition, the data block reading unit 209 decompresses the compressed data block and stores the decompressed data block in the temporary area of the cache disk 24 (Step D60; reference numeral F24 in FIG. 11). In this way, all data blocks of the logical volume are stored in the temporary area of the cache disk 24. At that time, the data block reading unit 209 also ensures the area required to store the data blocks in the cache disk 24.

Note that, the processing order of Steps D30 and D40 and Steps D50 and D60 are not limited to the above, but it may be appropriately changed. For example, after Steps D50 and D60 are performed, Steps D30 and D40 may be performed. Alternatively, the steps may be performed at the same time.

The restoring unit 211 restores the logical volume using the data blocks read by the data block reading unit 209, with reference to the de-duplication information 252 read by the block pattern reading unit 210 (Step D70; reference numeral F25 in FIG. 11). That is, the restoring unit 211 restores the logical volume on the basis of the de-duplication information and the data blocks stored in the temporary area of the cache disk 24. At that time, the restoring unit 211 appropriately copies the de-duplicated data blocks to restore the logical volume. Note that, at that time, the restoring unit 211 sequentially restores the logical volumes from the logical block which can be restored by the data blocks stored in the cache disk 24.

The restoring unit 211 checks whether data compression for the restored logical volume is designated (Step D80). For example, the operator may designate the data compression when the import function starts, or the de-duplication information 252 and information indicating whether the data compression is needed may be stored in the external storage medium 34 when the logical volume is exported.

When the compression of the logical volume is designated (a YES route in Step D80), for example, the data compressing unit 204 compresses the restored logical volume (Step D90) and stores the compressed volume in the cache disk 24 (Step D100; reference numeral F26 in FIG. 11). When the compression of the logical volume is not designated (a NO route in Step D80), the logical volume is stored in the cache disk 24, without being compressed (Step D100; reference numeral F26 in FIG. 11).

Data in the restored logical volume stored in the cache disk 24 is written to the storage medium 33 of the tape library device 3 by the migration process (Step D110; reference numeral F27 in FIG. 11) and the process ends.

Note that, after the logical volume is stored in the storage medium 33 by the migration process, the data blocks used to restore the logical volume are not needed and are deleted from the cache disk 24. At the time the import of all logical volumes from the external storage medium 34 is completed, a disk cache area which is provided only for the storage of the data blocks in the cache disk 24 is released.

As such, according to the virtual tape library system 1 according to the embodiment, in the export process, data is stored in a de-duplicated state in the external storage medium 34. Therefore, it is possible to store a large amount of data into the external storage medium 34 and improve the use efficiency of the external storage medium 34. In addition, in the export or import process, it is possible to reduce the amount of data which is transmitted to or received from the external storage medium 34 and reduce the time required for the processes. Since the amount of data stored in one external storage medium 34 can be increase, it is possible to reduce the number of external storage mediums 34 used. Therefore, it is possible to reduce the time required for the export or import process.

Since the data compressing unit 204 performs the compression process of compressing the data block stored in the external storage medium 34, it is possible to store a large amount of data into the external storage medium 34 and thus improve the use efficiency of the external storage medium 34. Therefore, it is possible to reduce the time required for the export or import process.

During the export process, when the duplicate storage determining unit 203 determines that the same data block as that to be processed has not been stored in the external storage medium 34, the tape storage processing unit 206 stores the data block in the external storage medium 34. In addition, when the duplicate storage determining unit 203 determines that the same data block has been stored in the external storage medium 34, the storage processing unit 206 prevents the data block from being stored in the external storage medium 34. Therefore, it is possible to reliably de-duplicate data in the external storage medium 34.

During the export process, the tape storage processing unit 206 stores the de-duplication information 252 about the data stored in the external storage medium 34 in the external storage medium 34. Therefore, during the import process, when the de-duplication information 252 is read out and used to restore data, it is possible to reliably restore the data which is stored in a de-duplicated state in the external storage medium 34. As a result, reliability is improved.

During an operation, when the data received from the host 100 is written, the duplicate storage determining unit 203 analyzes the duplication pattern of each data block. At that time, only the extraction of the de-duplication pattern and the registration of the de-duplication pattern in the de-duplication information 250 are performed and the data is stored in the cache disk 24 without performing the actual de-duplication process. Therefore, it is possible to perform the same process as that in the existing virtual tape library and convenience is improved.

Since a storage area only for data blocks is dynamically ensured in the cache disk 24 during the import process, it is possible to effectively restore the logical volume.

When a plurality of logical volumes are exported, the data selection unit 212 selects the logical volume with the largest number of data blocks which duplicate the data block group exported to the external storage medium 34 as the export execution logical volume. Therefore, a large number of data blocks duplicate the data blocks stored in the external storage medium 34 and it is possible to effectively use the external storage medium 34 using de-duplication or perform the export process at a high speed.

The data selection unit 212 selects the logical volume with the largest number of duplicate data blocks in the export target logical volume group as the export execution logical volume. Therefore, during the export process, many types of data blocks are stored in the external storage medium 34. When the data block is stored in the external storage medium 34, the rate of occurrence of the duplicate data blocks is expected to increase and it is possible to effectively use the external storage medium 34.

The invention is not limited to the above-described embodiment, but various modifications and changes of the invention can be made without departing from the scope and spirit of the invention.

Note that, when each embodiment of the invention is disclosed, the invention can be implemented and manufactured by those skilled in the art.

According to the disclosed technique, in the storage device, it is possible to reduce the amount of data stored in a storage unit for discharge and store a large amount of data in the storage unit for discharge. Therefore, it is possible to improve use efficiency. In addition, it is possible to reduce the time required to store data in the storage unit for discharge and read data therefrom.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage device comprising:
   a first storage unit that temporarily stores data;
   an accommodation unit that accommodates a second storage unit which stores the data;
   an access unit that accesses the second storage unit and a storage unit for discharge; and
   a control unit that controls access by the access unit,
   wherein the control unit includes:
   a data division unit that divides the data into data blocks;
   a duplicate storage determining unit that determines whether the same data block as that to be stored has been stored in the storage unit for discharge in an export process of storing the data into the storage unit for discharge;
   a data storage processing unit that stores the data block to be stored in the storage unit for discharge when the same data block has not been stored in the storage unit for discharge and prevents the data block to be stored from being stored in the storage unit for discharge when the same data block has been stored in the storage unit for discharge;
   a duplicate number determining unit that determines a number of duplicate data blocks between the data blocks of the data stored in the second storage unit and the data blocks of the data stored in the storage unit for discharge; and an order determining unit that determines an order in which the second storage unit is transported to the access unit based on the number of duplicate data blocks.

2. The storage device according to claim 1, further comprising:
a data block pattern storage unit that stores data block patterns for the data,
wherein, in the export process of storing the data into the storage unit for discharge, the data storage processing unit reads out the block pattern for the data stored in the storage unit for discharge among the data block patterns and stores the block pattern in the storage unit for discharge.

3. The storage device according to claim 1, further comprising:
a data compressing unit that compresses the data block,
wherein the data storage processing unit stores the compressed data block in the storage unit for discharge.

4. The storage device according to claim 1, further comprising:
a data selection unit that selects the data to be stored in the storage unit for discharge based on the number of duplicate data blocks.

5. The storage device according to claim 4,
wherein the data selection unit preferentially selects data with a large number of data blocks among the data stored in the second storage unit as the data to be stored in the storage unit for discharge.

6. The storage device according to claim 1, further comprising:
in an import process of storing the data stored in the storage unit for discharge into the first storage unit,
a data block reading unit that reads out the data block stored in the storage unit for discharge,
a block pattern reading unit that reads out the block pattern for the data stored in the storage unit for discharge, the block pattern being stored in the storage unit for discharge; and
a restoring unit that restores the data using the data block, with reference to the read block pattern.

7. A control device that controls access to a first storage unit which temporarily stores data and a second storage unit which stores the data, comprising:
a data division unit that divides the data into data blocks;
a duplicate storage determining unit that determines whether the same data block as that to be stored has been stored in a storage unit for discharge in an export process of storing the data into the storage unit for discharge;
a data storage processing unit that stores the data block to be stored in the storage unit for discharge when the same data block has not been stored in the storage unit for discharge and prevents the data block to be stored from being stored in the storage unit for discharge when the same data block has been stored in the storage unit for discharge;
a duplicate number determining unit that determines a number of duplicate data blocks between the data blocks of the data stored in the second storage unit and the data blocks of the data stored in the storage unit for discharge; and
an order determining unit that determines an order in which the second storage unit is transported to the access unit based on the number of duplicate data blocks.

8. The control device according to claim 7, further comprising:
a data block pattern storage unit that stores data block patterns for the data,
wherein, in the export process of storing the data into the storage unit for discharge, the data storage processing unit reads out the block pattern for the data stored in the storage unit for discharge among the data block patterns and stores the block pattern in the storage unit for discharge.

9. The control device according to claim 7, further comprising:
a data compressing unit that compresses the data block,
wherein the data storage processing unit stores the compressed data block in the storage unit for discharge.

10. The control device according to claim 7, further comprising:
a data selection unit that selects the data to be stored in the storage unit for discharge based on the number of duplicate data blocks.

11. The control device according to claim 10,
wherein the data selection unit preferentially selects data with a large number of data blocks among the data stored in the second storage unit as the data to be stored in the storage unit for discharge.

12. The control device according to claim 7, further comprising:
in an import process of storing the data stored in the storage unit for discharge into the first storage unit,
a data block reading unit that reads out the data block stored in the storage unit for discharge;
a block pattern reading unit that reads out the block pattern for the data stored in the storage unit for discharge, the block pattern being stored in the storage unit for discharge; and
a restoring unit that restores the data using the data block, with reference to the read block pattern.

13. A control method performed in a control device that controls access to a first storage unit which temporarily stores data and a second storage unit which stores the data, comprising:
dividing the data into data blocks;
determining whether the same data block as that to be stored has been stored in a storage unit for discharge in an export process of storing the data into the storage unit for discharge;
storing the data block to be stored in the storage unit for discharge when the same data block has not been stored in the storage unit for discharge and preventing the data block to be stored from being stored in the storage unit for discharge when the same data block has been stored in the storage unit for discharge;
determining a number of duplicate data blocks between the data blocks of the data stored in the second storage unit and the data blocks of the data stored in the storage unit for discharge; and
determining an order in which the second storage unit is transported to the access unit based on the number of duplicate data blocks.

14. The control method according to claim 13, further comprising:
storing data block patterns for the data,
wherein, in the export process of storing the data into the storage unit for discharge, among the data block patterns, the block pattern for the data stored in the storage unit for discharge is read and stored in the storage unit for discharge.

15. The control method according to claim 13, further comprising:
   compressing the data block,
   wherein the compressed data block is stored in the storage unit for discharge.

16. The control method according to claim 13, further comprising:
   selecting the data stored in the storage unit for discharge based on the number of duplicate data blocks.

17. The control method according to claim 13, further comprising:
   in an import process of storing the data stored in the storage unit for discharge in the first storage unit,
   reading the data block stored in the storage unit for discharge;
   reading the block pattern for the data stored in the storage unit for discharge from the storage unit for discharge; and
   restoring the data using the data block, with reference to the read block pattern.

* * * * *